United States Patent
Kottke

[19]
[11] Patent Number: 5,878,652
[45] Date of Patent: Mar. 9, 1999

[54] CAST, SUBSTANTIALLY HOLLOW, PISTON BODY

[75] Inventor: Richard Kottke, Ahrensburg, Germany

[73] Assignee: Dresser-Rand Company, Corning, N.Y.

[21] Appl. No.: 985,992

[22] Filed: Dec. 5, 1997

[51] Int. Cl.[6] .................................................. F16J 1/00
[52] U.S. Cl. ................................................ 92/258; 92/172
[58] Field of Search .............................. 92/172, 255, 256, 92/257, 258; 29/888.04, 888.044, 888.049

[56] References Cited

U.S. PATENT DOCUMENTS

| | | | |
|---|---|---|---|
| 680,465 | 8/1901 | Reynolds | 92/258 |
| 1,326,692 | 12/1919 | Rogatchoff | 29/888.041 |
| 1,811,737 | 6/1931 | Van Bezel | 92/255 X |
| 1,860,141 | 5/1932 | Ducommun | 92/172 |
| 2,478,179 | 8/1949 | Brockmeyer | 92/257 X |
| 3,149,543 | 9/1964 | Naab | 92/258 X |

FOREIGN PATENT DOCUMENTS

| | | | |
|---|---|---|---|
| 86114 | 8/1957 | Netherlands | 92/258 |

*Primary Examiner*—John E. Ryznic
*Attorney, Agent, or Firm*—Bernard J. Murphy

[57] ABSTRACT

In the embodiment shown, the body is formed of cast aluminum, and is devoid of clean-out holes in the upper and bottom ends thereof. Instead, the clean-out holes are formed in the outer, annular wall, through an annular recess formed in the outer wall, To close off the clean-out holes, a steel band is nested in the recess, in circumscription of the body. Further, the steel band has grooves formed therein in which to accommodate piston rings.

11 Claims, 1 Drawing Sheet

CAST, SUBSTANTIALLY HOLLOW, PISTON BODY

BACKGROUND OF THE INVENTION

This invention pertains to pistons, such as are used in gas compressors, pumps, and like equipments, which are formed in foundries by casting methods, and in particular to a cast, substantially hollow piston body, for a piston, of novel construction.

The known method of forming cast piston bodies, particularly cored piston bodies, comprises the forming of clean-out holes in the upper and lower ends or top and bottom walls of the piston body. After the interior of the piston body is satisfactorily cleaned, then its clean-out holes are machined to receive closure plugs. However, during use of the pistons which have these clean-out hole plugs therein, it happens that the plugs work free. The plugs have a tendency to loosen and remove from the holes. As a consequence, the gas compressor or pump in which these pistons are employed suffers grevious damage.

In view of the aforesaid problem with plugged clean-out holes in piston bodies, there obtains a need for an improved piston body. The need is for means which close off the clean-out holes, following clean-out of the piston body interior, which are not susceptible to displacement. In addition, it is also desirable to have piston bodies with generously large clean-out holes.

It is an object of this invention, then, to meet the aforecited need and, in so doing, define a piston body which has a great plurality of large clean-out holes formed therein.

Particularly, it is an object of this invention to set forth a cast, substantially hollow, piston body, comprising an annular outer wall; an annular, imperforate, top wall integral with said outer wall; an annular, imperforate, bottom wall integral with said outer wall; and an axial, central, piston rod-receiving bore; wherein said outer wall has a plurality of clean-out holes formed therein.

Further objects of this invention, as well as the novel features thereof, will be apparent by reference to the following description, taken in conjunction with the accompanying figures, in which:

DETAILED DESCRIPTION

Figure 1:
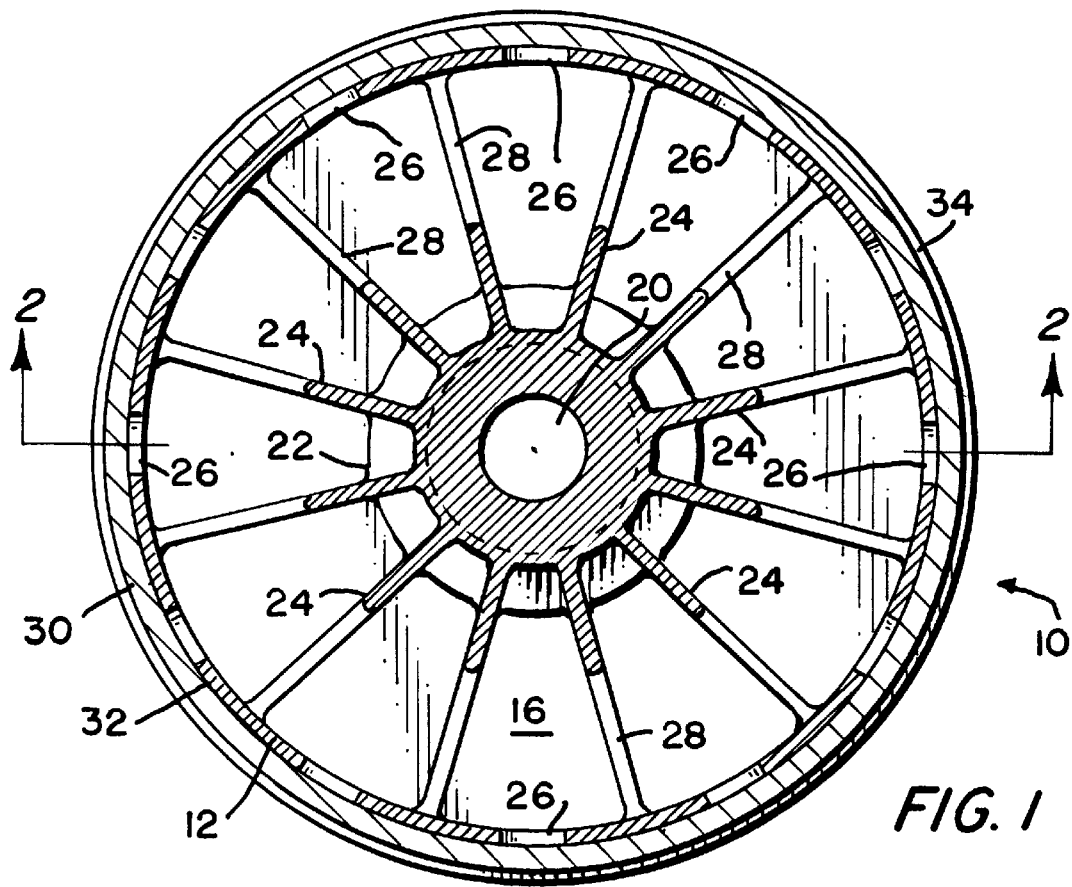
FIG. 1 is a cross-sectional view, taken along section 1—1 of FIG. 2, of an embodiment of the invention.
Figure 2:
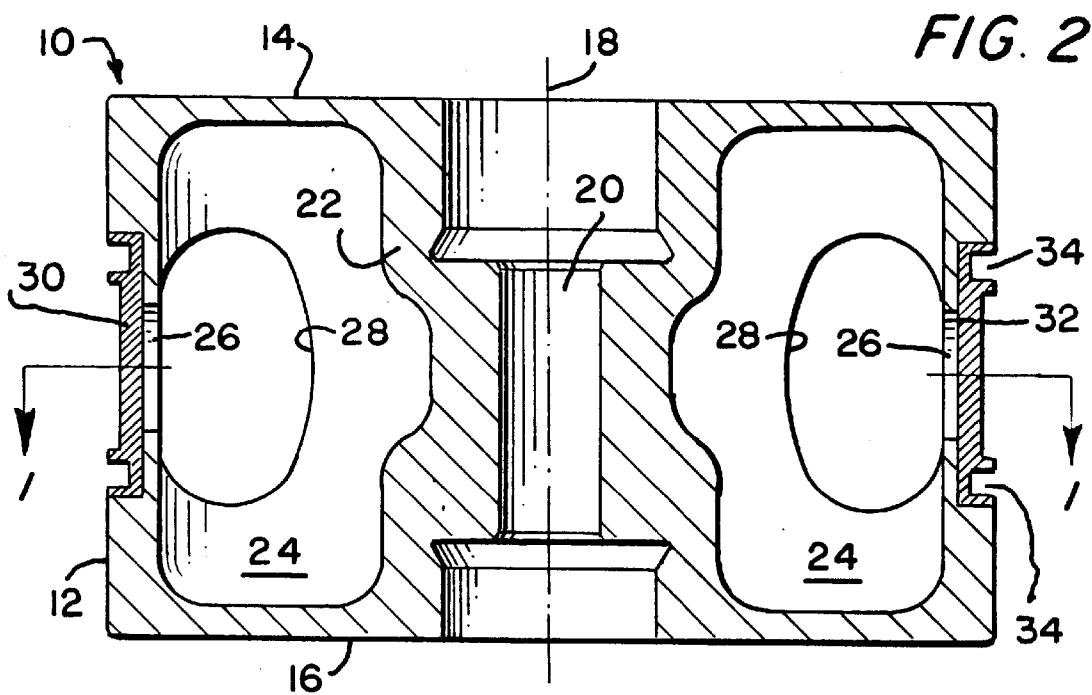
FIG. 2 is a cross-sectional view of the FIG. 1 embodiment, taken along section 2—2 of FIG. 1.

As shown in the figures, an embodiment of the invention comprises a cast, substantially hollow, piston body 10. The body 10 has an outer wall 12, an annular, imperforate, top wall 14 which is integral with said outer wall 12, an annular, imperforate, bottom wall 16, and an axis 18. In addition, the body 10 has an axial, central, piston rod-receiving bore 20. The bore 20 is formed in a central cylinder 22 which extends between, and is integral with, the top wall 14 and the bottom wall 16. A plurality of radially-extending webs 24 extend between, and are integral with, the outer wall 12 and the cylinder 22.

According to the invention, clean-out holes 26 are formed in the outer wall 12, each of the holes 26 is formed between adjacent ones of the webs 24. Further, the webs 24 are cored; each thereof has a large aperture 28 formed therein.

As explained in the foregoing, the clean-out holes 26 need to be closed off after the piston body 10 has been cleaned out. A band 30 is provided for the purpose. To accommodate the band 30, the outer wall 12 has a recess 32 formed therein. The clean-out holes 26 are formed through the recess, and the band 30 nests in the recess 32 in closure of all the clean-out holes 26. In the instant embodiment, the piston body 10 is formed of cast aluminum, and the band 30 is formed of steel. While not shown, the band 30 is welded in place in circumscription of the body 10. To accommodate for piston rings, the band 30 has a plurality of grooves 34 formed therein.

The invention makes it unnecessary to have clean-out holes in the top and bottom walls 14 and 16, and in providing the clean-out holes 26 in the outer wall 12, the holes can be generously large. The welded-in-place band 30 satisfactorily closes off the holes 26, and for being nested in the recess 32, and welded, it is not susceptible of displacement from the body 10.

While I have described my invention in connection with a specific embodiment thereof, it is to be clearly understood that this is done only by way of example, and not as a limitation to the scope of the invention as set forth in the objects thereof, and in the appended claims.

I claim:

1. A cast, substantially hollow, piston body, comprising:

an annular, outer wall;

an annular, imperforate, top wall integral with said outer wall;

an annular, imperforate, bottom wall integral with said outer wall; and an axial, central, piston rod-receiving bore; wherein said outer wall has a plurality of clean-out holes formed therein.

2. A piston body, according to claim 1, wherein:

said outer wall has an annular recess formed therein; and said clean-out holes are formed through said recess.

3. A piston body, according to claim 1, further including:

a central cylinder extending between, and integral with, said top and bottom walls; and said bore is formed in said cylinder.

4. A piston body, according to claim 3, further including:

a plurality of radial webs extending between said outer wall and said cylinder.

5. A piston body, according to claim 4, further including:

core holes formed in said webs.

6. A piston body, according to claim 3, wherein:

said clean-out holes are formed in said outer wall between adjacent ones of said webs.

7. A piston body, according to claim 3, wherein:

said bore has a plurality of diameters.

8. A piston body, according to claim 1, further including:

a band (a) circumscribing said body, and (b) covering said clean-out holes.

9. A piston body, according to claim 2, further including:

a band (a) nested in said recess, and (b) covering said clean-out holes.

10. A piston body, according to claim 8, wherein:

said band has annular grooves formed therein.

11. A piston body, according to claim 9, wherein:

said band has a plurality of piston ring grooves formed therein.

* * * * *